United States Patent
Vlad et al.

(10) Patent No.: US 11,995,414 B1
(45) Date of Patent: May 28, 2024

(54) AUTOMATIC POST-EDITING SYSTEMS AND METHODS

(71) Applicant: SDL Inc., Wakefield, MA (US)

(72) Inventors: Mihai Vlad, London (GB); Dragos Stefan Munteanu, Los Angeles, CA (US); Bartlomiej Czeslaw Maczynski, Silver Spring, MD (US); Jingyi Han, Barcelona (ES); Ovidiu Petridean, Cluj-Napoca (RO); Arnaud Simon, Givry (FR)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 18/373,938

(22) Filed: Sep. 27, 2023

Related U.S. Application Data

(60) Provisional application No. 63/534,971, filed on Aug. 28, 2023.

(51) Int. Cl.
*G06F 40/56* (2020.01)
*G06F 40/30* (2020.01)
*G06F 40/58* (2020.01)

(52) U.S. Cl.
CPC .............. *G06F 40/56* (2020.01); *G06F 40/30* (2020.01); *G06F 40/58* (2020.01)

(58) Field of Classification Search
CPC ........... G06F 40/30; G06F 40/56; G06F 40/58
See application file for complete search history.

(56) References Cited

U.S. PATENT DOCUMENTS

| | | | | |
|---|---|---|---|---|
| 11,551,013 | B1 * | 1/2023 | Gupta | G06F 40/40 |
| 2002/0040292 | A1 * | 4/2002 | Marcu | G06F 40/253 |
| | | | | 704/7 |
| 2005/0055217 | A1 * | 3/2005 | Sumita | G06F 40/45 |
| | | | | 704/277 |
| 2014/0358519 | A1 * | 12/2014 | Mirkin | G06F 40/47 |
| | | | | 704/2 |
| 2017/0091177 | A1 * | 3/2017 | Sonoo | G10L 13/08 |
| 2018/0143975 | A1 | 5/2018 | Casal et al. | |
| 2019/0065463 | A1 | 2/2019 | Ukrainets et al. | |
| 2020/0363865 | A1 * | 11/2020 | Powderly | G06F 3/013 |
| 2021/0019373 | A1 * | 1/2021 | Freitag | G06F 40/51 |
| 2021/0141867 | A1 * | 5/2021 | Wason | G06V 10/82 |
| 2023/0252245 | A1 * | 8/2023 | Johnson | G06F 40/51 |
| | | | | 704/8 |

OTHER PUBLICATIONS

Zhen Yang, Wei Chen, Bo Xu, "Improving Neural Machine Translation with Conditional Sequence Generative Adversarial Nets", 2017, Institute of Automation, Chinese Academy of Sciences, public on p. Nov. 8, 2017, pp. 1-10 (Year: 2017).*

* cited by examiner

*Primary Examiner* — Eric Yen

(74) *Attorney, Agent, or Firm* — Carr & Ferrell LLP

(57) ABSTRACT

Automatic post-editing of machine translated content is disclosed herein. An example method includes presenting a user with machine translated segments of a document and their associated quality estimation scores, allowing a user to invoke an automated post-editing system for segments with unsatisfactory translation quality, inputting the segments into a generative AI model alongside contextual information, producing a revised translation of the segment using the generative AI model and iterating the generative AI process with varying prompts until a satisfactory translation is achieved or a predetermined number of attempts are reached.

20 Claims, 6 Drawing Sheets

Ⓐ al.portal.languageweaver.com/translation-edit/4a3fd6ac-c9e8-329c-9140-7aabdd4bae42

< Exit Feedback Editor | Download | Warren Weaver- The Legacy.docx - English to French, GenericQE Search segments... | Segments Status: All | Quality Estimation: All translation.

5  Written before most people had any idea of what computers might be capable of, it was the direct stimulus for the beginnings of research in the United States. ←202
6  The background
7  Warren Weaver was born on the 17th July 1894 in the small Wisconsin town of Reedsburg into a family descended from German 18th century immigrants.
8  Fascinated by all things mechanical and entered in 1912 he entered the university of Wisconsin to study civil engineering
9  In late 1931 he was invited to apply for the directorship of the Natural Sciences Division of the Rockefeller Foundation, the post he was to fill with great distinction for the next 27 years.
10 Among his first action was the inauguration of a programme to support quantitative experimental biology and molecular biology not just in the United States but in Europe and elsewhere with crucial and far-reaching consequences (Weaver 1970).
11 He collaborated with Richard courant in plans for strengthening advanced mathematics research in the United States, and the establishment of the Courant Institute of New York University
12 The home of the Courant Institute at New York University is Warren Weaver Hall.
13 During the War, at the invitation of vannevar Bush - the pioneer of the mechanical and electronic analog calculator - Weaver joined the Office of Scientific Research and Development, directing the work of several hundred mathematicians on operations research
14 In this position, he had close contacts with many of the American computing pioneers, such as Howard Aiken, George Stibitz and John von Neumann.
15 Indeed, it was at Weaver's invitation that von Neumann wrote for AMP a report that represented an important step towards the formulation of the blueprint for all future computers (Aspray, 1990:240).
16 The memorandum
17 Weaver had first mentioned the possibility of using the computer to translate in March 1947,
18 The memorandum met with scepticism among some recipients, and enthusiasm among others, including Eriwin Reifler (University of Washington) and Abraham Kaplan (Rand), who both began investigations.

Segments:30 | Go to Segment: [ ] [1] [30]

Ⓐ                                                                                                                                                                                                    Ⓑ

FIG. 2 automatique

Écrit avant que la plupart des gens n'aient aucune idée de ce que les ordinateurs pourraient etre capables de faire, il a ete le catalyseur direct de la recherche aux Etats-Unis. 208

Le contexte

Warren Weaver est ne le 17 juillet 1894 dans la petite ville de Reedsburg dasn le Wisconsin,dans une famille descendante d'immigrants allemands du 18e siecle 206

Fasciné par tout ce qui est mécanique et electrique, il entre a l'Universite du Wisconsin en1912 pour etudier l'ingenierie civile.

| | |
|---|---|
| ○ | Evaluated Quality |
| ○ | Auto Post-Edited |
| | En 1912,il a ete fascine par toutes les choses mecaniques et electriques, et il a decide detudier le genie civil a l'Universite du Wisconsin |
| ○ | Quality Evaluation Complete |
| ○ | Auto Post-Edited |
| | Fascine par tout ce qui est mecanique et electrique, il entre a l'universite du Wisconsin en 1912 pour etudier l'ingenierie cicile |
| ○ | Quality Evaluation Complete |

En 1931, il a ete invite a postuler pour le poste de directeur de la division des sciences natun qu'il a occuoe avec distinction pendant 27 ans Parmi ses premieres actions, il a lance un programme de soutien a la biologie experimental seulement aux Etats-Unis mais aussi en Europe et ailleurs, avec des consequences cruciales Il a collabore avec Richard Courant pour renforcer la recherche en mathematiques avancees courant de l'Universite de New York Le batiment qui abrite le Courant Institute de l'Universite de New York est Warren H Pendant la guerre, a l'invitation de Vannevar Bush, pionnier de la calculatrice analogique me le Bu scientifique et du developpement, dirigeant les travaux de plusieu recherche operationnelle.

A ce poste, il a eu des contacts etroits avec de nombreux pionniers americains de l'informat John En effet, c'est a l'invitation de Weaver que von Neumann a ecrit pour AMP un rapport qui rep formulation du plan directeur pour tous les futurs ordinateurs (Aspray 1990:240).

Le memorandum

Weaver avait mentionne pour la premiere fois la possibilite d'utiliser l'ordinateur pour traduire en mars 1947.

Le memorandum a rencontre le scepticisme de certains recipiendaires, et l'enthousiasme d'autres,Don't Erwin Reifler (Universite deWashington) et Abraham Kaplan (Rand), qui ont tous deux commence des enuetes.

Pause Auto Post-Edit 214

204  210  212

Changes saved

FIG. 2 (Continued)

AUTOMATIC POST-EDITING SYSTEMS AND METHODS

CROSS-REFERENCE TO RELATED APPLICATIONS

This non-provisional application claims the benefit and priority of U.S. Provisional Application Ser. No. 63/534,971, filed on Aug. 28, 2023, which is hereby incorporated herein by reference, including all appendices as if fully set forth herein.

FIELD

The present disclosure pertains broadly to machine translation (MT), and more specifically to the automatic post-editing of machine translated content.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for automated post-editing of machine translated content. The method also includes presenting a user with machine translated segments of a document and associated quality estimation scores for each of the machine translated segments. The method also includes allowing a user to invoke an automated post-editing system for the machine translated segments with unsatisfactory quality estimation scores. The method also includes inputting the machine translated segments into a generative AI model. The generative AI model uses contextual information for the document. The method also includes producing a revised translation of a machine translated segment having an unsatisfactory translation quality (low quality estimation score) using the generative AI model. The method also includes iterating with the generative AI model with varying input until a final translation is achieved or a predetermined number of attempts are reached. Other embodiments of this aspect include corresponding computer systems, apparatus, and computer programs recorded on one or Implementations may include one or more of the following features. The method where iterating includes: generating an updated quality estimation score for each revised translation, and generating an additional revised translation when the updated quality estimation score is unsatisfactory. Quality estimation scores associated with the machine translated segments are generated using a machine translation quality estimation model that is configured to identify machine translated segments with unsatisfactory translation quality. The contextual information provided to the generative AI model may include a variable window of text adjacent to each of the machine translated segments. The generative AI model employed for revising a machine translated segment is based on a transformer architecture. The automated post-editing system utilizes a machine translation quality estimation model to determine which machine translated segments require automated post-editing based on quality estimation scores. The generative AI model is iteratively prompted with varying input to enhance a quality of the revised translation, with the varying input being generated based on unsatisfactory aspects of previous translation attempts. A user is presented with an option to manually intervene and provide input to the generative AI model to further improve a quality of the revised translation. The predetermined number of attempts for achieving a satisfactory translation is configurable by the user or system administrator. The automated post-editing system maintains a log of iterations, including prompts and responses, to facilitate analysis and quality control of the automated post-editing system. The automated post-editing system incorporates feedback from a database to override a top candidate generated by the generative AI model. The method may include allowing the user to override a choice made by the automated post-editing system. The method may include calculating before and after machine translation quality estimation (MTQE) scores for a whole paragraph or the document. The method may include accepting human translation as input instead of machine translation and applies automated post-editing to enhance the human translation. The method may include incorporating an additional agent to further enhance output of the automated post-editing system. Implementations of the described techniques may include hardware, a method or process, or computer software on a computer-accessible medium.

One general aspect includes a method for enhancing machine translated content using contextual information. The method also includes translating a source segment into a target segment using a machine translation engine. The method also includes evaluating a quality of the target segment with a machine translation quality estimation model. The method also includes extracting contextual information from surrounding content and available metadata of the target segment. The method also includes inputting the target segment, the quality, and the contextual information into a generative AI model. The method also includes generating an improved translation of the source segment based on the target segment. Other embodiments of this aspect include corresponding computer systems, apparatus, and computer programs recorded on one or more computer storage devices, each configured to perform the actions of the methods.

One general aspect includes a system for automated improvement of machine translated content. The system also includes an interface for displaying machine translated segments of a document, associated quality estimation scores, and options for invoking automatic post-editing. The system also includes a machine translation engine configured to produce the machine translated segments of source content. The system also includes a quality estimation model in communication With the machine translation engine and configured to evaluate and create quality estimation scores for each of the machine translated segments. The system also includes a generative AI model operatively coupled to the interface, and configured to receive user input and contextual information about one or more of the machine translated segments. The system also includes a feedback mechanism for the generative AI model to use previous outputs and additional prompts to iteratively produce improved translations based on the contextual information and feedback from the quality estimation model. Other embodiments of this aspect include corresponding computer systems, apparatus, and computer programs recorded on one or more computer storage devices, each configured to perform the actions of the methods.

Implementations may include one or more of the following features. The system where the machine translated segments are presented to a user in an interface, enabling selection and invocation of the generative AI model. The quality estimation scores are generated using a machine translation quality estimation model, which identifies machine translated segments with unsatisfactory translation quality (as evidenced by a poor translation quality score). The contextual information provided to the generative AI model may include a variable window of document context surrounding each of the machine translated segments to be automatically post-edited. Implementations of the described techniques may include hardware, a method or process, or computer software on a computer-accessible medium.

BRIEF DESCRIPTION OF THE DRAWINGS

Exemplary embodiments are illustrated by way of example and not limited by the figures of the accompanying drawings, in which references indicate similar elements.

FIG. 2 is a screenshot of a graphical user interface including the output of an automated machine translation system.

DETAILED DESCRIPTION OF EXAMPLE EMBODIMENTS

Overview

Figure 1:
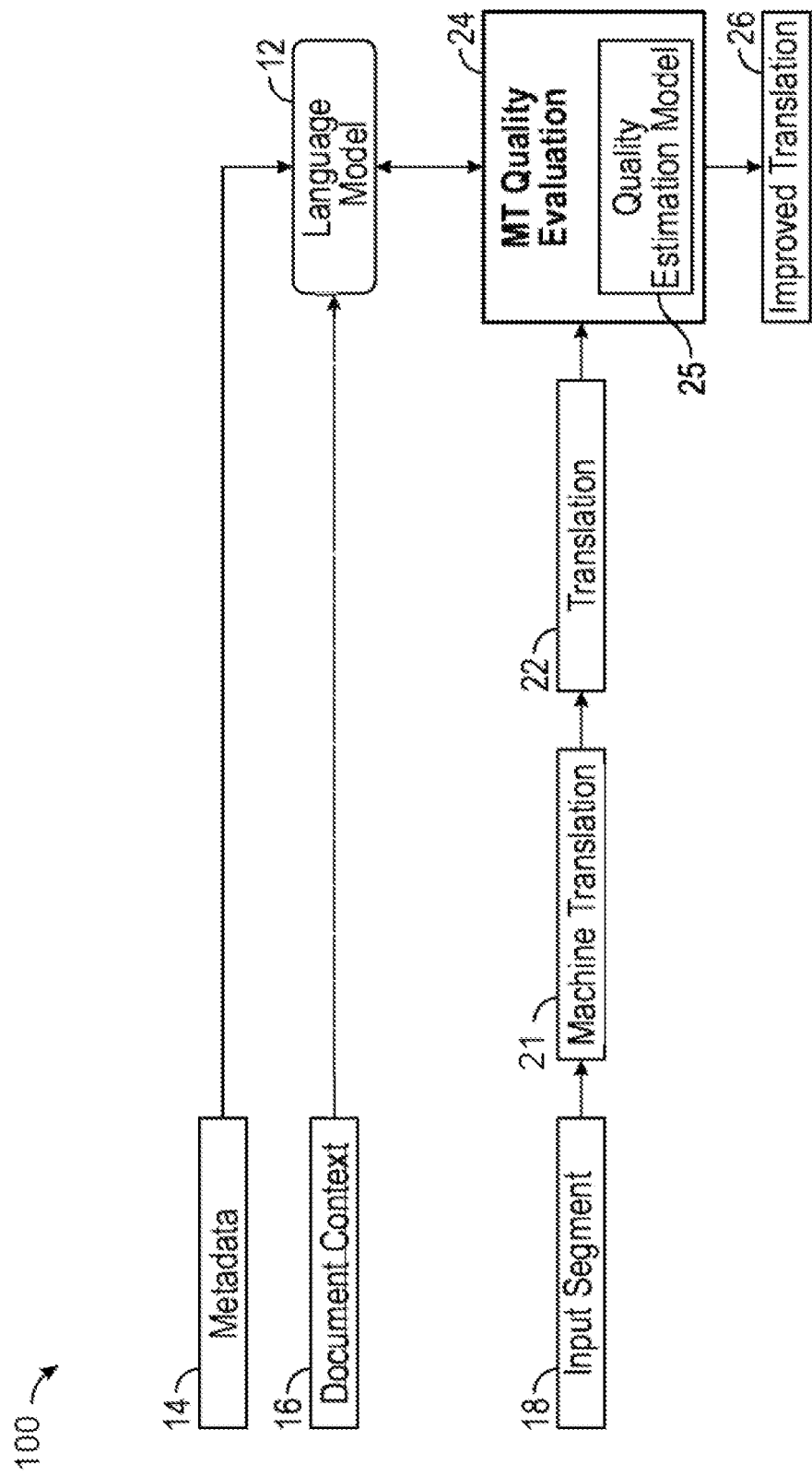
FIG. 1 is an example architectural environment where aspects of the present disclosure can be practiced.

The quality of a machine translated sentence (also called a segment) can vary with the complexity of the content, the target language, the domain and the purpose of the translation—just to name a few. Across all machine translation use cases, there is a strong distinction between the "raw MT" (direct machine translation output) workflows, and the MTPE ("Machine Translation Post-Editing) workflows. The reason for the distinction is a combination of cost, quality, and speed. Human translation is expected to be high quality but it is expensive and slow. Also, basic machine translation only considers the source segment during translation, using a traditional ML/TM (or equivalent). There are no other types of data that can be used to improve the outcome of the translation process, except feedback provided by humans.

Machine translation has made tremendous improvements, especially in fluency, and it is very fast and relatively inexpensive. As a result, for most practical applications, any degree of human intervention in the translation process lowers the speed of translation and increases its cost.

The most expensive machine translation process is one that calls for human post-editing. That is, a workflow that requires a professional translator or a bilingual domain expert to review the Machine Translated output and improve/adapt it for purpose, terminology, style, tone, register, and so forth by editing the target segment. Any reduction of that human effort, including by means of automated post-editing, will provide a reduction in cost and an increase of speed of the MTPE process.

Currently, the only technology that can make a significant impact on the time required to post edit is quality estimation. A MT Quality Estimation (MTQE) model can assess the quality of the translation by providing either a score or a label (good, bad, mediocre). This allows post-editors to focus only on poor translations.

EXAMPLE EMBODIMENTS

Broadly, the systems and methods herein provide self-healing machine translations or are referred to as auto-improving machine translations. These systems and methods provide Automated Post-Editing (APE) that improves a translation outcome by using a tertiary model to automatically edit a target sentence or produce a new translation or select a best candidate from a series of target sentences. The model may not necessarily be a "language" model; also, the model may be used to produce a new translation, not just edit the target or select a candidate. Also, the model could be an MT (machine translation), TM (translation memory), or human translation—just as examples.

The systems and methods disclosed herein, when invoked by a post-editor, can automatically create a better translation (e.g., a first MT of a segment, a review of that MT segment, and refinement of the MT segment (new translation) by a trained model). This eliminates the need for the human to produce this new translation by hand, thus making the post-edit work faster and easier.

An example system of the present disclosure can take advantage of various sources of information that are not available to a traditional MT system (the one which produced the translation that needs to be post-edited). These sources of information include (but are not limited to): a result of an MTQE (Machine Translation Quality Estimation) evaluation of the segment in question; a variable window of document context around the segment in question; and/or a (human-provided) indication of the domain of the document. However, it will be understood that these examples are not intended to be limiting and can include other types of information that are determined to be helpful in generating and improving machine translations.

In the realm of machine translation as disclosed herein, two workflows are distinguished: raw MT (direct machine translation output) and MTPE (Machine Translation Post-Editing). This distinction arises from a combination of factors including cost, quality, and speed. Raw machine translation is the direct output of a machine translation system. It is fast and relatively inexpensive but may have variable quality, especially for complex content. Machine Translation Post-Editing (MTPE) involves human intervention to review and improve the machine-translated output. It ensures higher quality but at the cost of speed and expense. MTPE can be performed by professional translators or bilingual domain experts.

To address the trade-off between quality, cost, and speed in MTPE, the present disclosure provides for Automated Post-Editing (APE), which leverages advanced language models and quality estimation techniques. MT Quality Estimation (MTQE) models can be used to assess the quality of machine-translated content by providing scores or labels (e.g., good, bad, mediocre). This allows post-editors to focus on improving only the segments with poor quality and can be used as the basis for automatic iterative translation to improve translated segments.

FIG. 1 is an example workflow of an MT system of the present disclosure. In general, the workflow 100 includes a language model 12 (MT, ML (machine learning), AI (artificial intelligence), NN (neural network), LLM (large language model) or equivalent), that is configured to receive metadata 14, and document context 16 information. An input segment 18 is processed via a first type of machine translation 21 (also referred to as "primary translation mechanism 21" or "machine translation model 21") to generate a first translation 22. Then the first translation 22 is processed to determine a machine translation quality 24 (using a quality estimation model 25), which is used by the language model 12 to improve the first translation 22 (using metadata/document context, and so forth) to generate a machine translated, improved translation 26.

In general, the machine translation workflow 100 improves translation quality in an automated manner. The use of the language model 12, metadata 14, document context 16, and MTQE model can significantly improve the quality of machine translations. The workflow is highly automated, which saves time and effort, and the workflow is scalable to handle large volumes of text.

In more detail, with respect to the language model 12, these models can be predicated on advanced technologies, including but not limited to Neural Networks (NN), Machine Translation (MT), Machine Learning (ML), and Large Language Models (LLM). They serve as the primary translation agents, assimilating information, processing it, and producing relevant output. By leveraging vast datasets and intricate architectures, they can produce translations that mirror human-like accuracy and fluency.

Language models are built upon a plurality of technologies and techniques that enable them to perform at high levels of accuracy and fluency. In the context of language models, neural networks consist of layers of interconnected nodes or neurons. These networks are designed to process and learn from large amounts of textual data. Deep neural networks, particularly deep learning models like transformers are the backbone of state-of-the-art language models.

MT systems use algorithms and statistical techniques to automatically translate text or speech from one language to another. Language models leverage MT to understand the nuances of languages and improve translation accuracy. They can also adapt to different language pairs and domains.

Language models are a subset of machine learning applications. ML algorithms enable these models to learn from data and improve their performance over time. They use techniques such as supervised learning, unsupervised learning, and reinforcement learning to optimize their language understanding and generation capabilities.

Large Language Models are characterized by vast size and extensive training datasets. These models contain billions of parameters and can be trained on massive text corpora, encompassing diverse languages and topics. This extensive training allows them to capture complex language patterns and generate coherent, contextually relevant output.

The workflow of advanced language models can involve some or all of the following. Language models preprocess input data by tokenizing and encoding text into numerical representations that can be fed into neural networks. The neural networks within these models undergo extensive training on massive datasets. They learn to recognize patterns, relationships, and context within the data. During inference, the language model processes input text and generates output based on what it has learned. This output can include translations, summaries, answers to questions, and more.

Language models can be fine-tuned on specific tasks or domains to enhance their performance for particular applications. For example, they can be fine-tuned for medical translation, legal documents, or customer support interactions. Continuous evaluation and refinement are essential to improve the model's accuracy and fluency. Feedback from users helps in identifying areas where the model can be enhanced, however, it is an advantage of the system that it provides automated or self-healing translations.

Metadata 14, acts as supplementary information enriching the translation process. This might encompass data like the document's genre, intended audience, or even its provenance. In the digital realm, metadata acts as a guiding framework, assisting the model in understanding the context better. The document's origin, its intended reader demographic, or even its linguistic idiosyncrasies can all be gleaned from this layer of information. While language models are powerful at processing and generating text, they may lack a deep understanding of the specific context in which a document was created or the intended audience. Metadata fills this gap by providing valuable context.

One aspect of metadata is the document's genre. Genres can vary widely, from academic papers to news articles, legal contracts, fiction, and more. Understanding the genre helps the language model tailor its translation to match the conventions, tone, and style associated with that genre. For example, a legal document may require a formal and precise translation, while a piece of fiction may demand a more creative and literary approach.

Metadata can also include information about the intended audience for the document. Knowing whether the text is meant for experts, general readers, children, or a specific demographic allows the language model to adapt its translation to the comprehension level and preferences of the target audience. This ensures that the translation is not only accurate but also accurate for readers.

Provenance information within metadata indicates the document's source or origin. It can reveal whether the document is an official government report, a blog post, a historical manuscript, or any other type of content. Understanding the source helps the language model interpret any domain-specific terminology or jargon and ensures that the translation is contextually appropriate.

Metadata can act as a framework for language models. It assists the model in understanding the context better by providing insights into the document's purpose, historical context, and relevance. This contextual understanding helps the model generate translations that are not only linguistically accurate but also contextually coherent.

Metadata can also include information about linguistic idiosyncrasies or specific language variations used within the document. For instance, if the document contains dialectical language, regionalisms, or specialized terminology, metadata can signal these nuances to the language model, enabling it to produce translations that preserve these unique features.

With metadata, language models disclosed herein can perform adaptive translation. They can adjust their translation strategies based on the metadata information provided. For example, if the document is a technical manual intended for engineers, the model can prioritize accuracy and technical precision. If it's a marketing brochure for a global audience, the model can focus on making the translation persuasive and culturally appropriate.

Metadata can also assist in quality control. It helps reviewers and translators understand the context and purpose of the document, allowing them to assess whether the translation aligns with the original document's intent.

Document context 16 offers a deeper view of the content of the source material. Context can reveal the tone, narrative arc, and inherent nuances of the document. This component enables the system to understand the semantics of the content better. For instance, the system can differentiate between multiple interpretations of a word or phrase by analyzing its placement and relationship within the broader context of the document.

Document context goes beyond surface-level language and considers the semantic meaning of the content. It helps the language model decipher the underlying message, intent, and implications of the text. This is crucial because many words and phrases can have multiple meanings depending on the context in which they are used. Document context assists the model in disambiguating these meanings and choosing the most appropriate interpretation.

Document context provides insights into the tone and style of the source material. It helps the language model capture the author's or speaker's intended emotional and stylistic nuances. For example, it can discern whether a passage is meant to be humorous, formal, informal, persuasive, or informative. This understanding allows the model to produce translations that align with the tone and style of the original text. Document context helps the model identify the beginning, middle, and end of a narrative. This comprehension enables the model to maintain coherence and consistency in the translation, ensuring that the translated text follows the same narrative flow as the original.

Ambiguity is common in natural language, where a single word or phrase can have multiple interpretations. Document context aids in disambiguating such cases by considering the broader context in which the ambiguous word or phrase appears. This prevents misinterpretations and improves the accuracy of the translation.

Document context allows the model to analyze the relationships between words, phrases, and sentences within the source material. It can recognize dependencies, references, and connections that are essential for maintaining coherence in the translation. For instance, it can be used to identify pronoun references and ensure they are correctly resolved.

Depending on the document's subject matter, document context may also provide insights into cultural and historical references. This is important when translating texts that contain references to specific events, traditions, or cultural norms. Document context also enables a language model to interpret the source material holistically. Rather than translating individual words or phrases in isolation, it considers the entire document's context, allowing for a more coherent and contextually accurate translation.

By considering the document context, the language model can generate translations that flow naturally and sound more human-like. This enhances the overall fluency of the translated text, making it more accessible and engaging to the target audience.

Input segment 18 represent the discrete portion of the source document that's to be translated. In MT systems, documents are often segmented to allow for a more focused translation process. By breaking down the text into smaller chunks, the system can hone in on specific segments, ensuring precision, and context preservation.

The primary translation mechanism (first translation) 21 employed by the system is the initial algorithmic process that takes the input segment and produces the preliminary translated output. This first pass might leverage rule-based, statistical, or neural translation methodologies, offering a baseline translation upon which further refinements can be built.

The primary translation mechanism 21 can employ various methodologies to perform the initial translation. Various methods can be used. For example, rule-based translation relies on predefined linguistic rules and patterns. It involves the use of dictionaries, grammatical rules, and syntactical structures to translate text. While rule-based systems can be precise, they may struggle with handling nuanced or context-dependent translations. Statistical machine translation relies on statistical models that analyze large bilingual corpora to determine the likelihood of a given translation. This approach can handle a wide range of language pairs and is data-driven. However, it may not capture the subtleties of language as effectively as neural models. Neural machine translation (NMT) leverages deep learning models, such as neural networks, particularly transformer-based architectures. NMT can capture complex language patterns and context and it excels at handling ambiguity and producing fluent translations.

The preliminary translation generated by the primary translation mechanism serves as a baseline or starting point. It may not be perfect, but it provides a meaningful translation of the input segment. This baseline is valuable for several reasons. Firstly, efficiency, as it offers a quick and automated translation, which can be especially useful for handling large volumes of text. The baseline translation forms the basis for further refinement. It provides a foundation upon which post-processing steps, such as editing, proofreading, and context-based adjustments, can be applied to enhance the quality of the translation.

Translation as disclosed herein is an iterative process. Once the primary translation is generated, it can undergo multiple rounds of review and improvement. Post-processing algorithms can fine-tune the translation based on context, style, and domain-specific knowledge. Depending on the application and domain, the primary translation mechanism can be customized to prioritize certain translation methodologies. For example, in legal or medical domains, rule-based approaches may be favored for precision, while in creative writing, neural models might be preferred for fluency. The choice of translation methodology can be adaptable to the specific needs of the translation task. If the system encounters a challenging input segment, it can switch between different methodologies to find the most suitable translation approach.

The first translation 22 is the immediate output derived from the primary machine translation process. It serves as the system's initial interpretation of the input segment, providing a foundation for subsequent quality assessments and refinements. The machine translation quality is an evaluative measure assessing the accuracy, fluency, and context relevance of the first translation. Leveraging predefined standards or benchmarks, this evaluation helps gauge the translation's fidelity and comprehensibility. It plays a pivotal role in deciding whether further refinements are required.

With respect to machine translation quality 24 estimations, the quality of machine-translated content is a factor in determining its usability and effectiveness. The following discussion delves into the nuances of machine translation quality, the distinction between raw machine translation and post-editing workflows, and the role of automated post-editing in enhancing translation outcomes.

The quality of a machine-translated sentence or segment can vary significantly based on multiple factors. Complex content with specialized terminology or intricate language structures may pose challenges for machine translation, leading to lower quality outputs. Some language pairs are inherently more challenging for machine translation due to linguistic differences, resulting in variations in translation quality. Different domains (e.g., medical, legal, technical) may require domain-specific knowledge for accurate translation, impacting quality. The intended purpose of the translation, whether for informational, legal, marketing, or creative purposes, influences the desired quality level.

To improve machine translations further, the systems disclosed herein can leverage various sources of information not available to a standard machine translation system. For example, the output of MTQE evaluations provides insights into the quality of the segment to be post-edited. Also, document context can be used. For example, a variable window of document context surrounding the segment can offer valuable contextual cues for improved translation. Also, human-provided domain information helps the system adapt its post-editing to the specific domain of the document.

A post-editor can be presented with an interface (see FIG. 2) showing the source segments of the document, the machine translation outputs, and the respective quality estimation scores for each output. The interface may also have buttons for producing improved translations; one that would apply to all segments (whose quality estimation score is not good), but also for individual segments.

For each relevant segment, when one of these buttons is activated, the system can invoke a generative AI (Artificial Intelligence) model, providing the AI model with (some of) the pieces of information from below, and asking it to produce a better target segment. Additionally, the system can invoke source segment and MT output, as well as a MTQE score/label.

The system can invoke context derived from the translated text itself: for example, sentences before and after the translated sentence, or the whole paragraph in which the translated segment is located, as well as context derived from available metadata, such as the domain, industry, company/brand, type of document, intended audience and purpose, the writer persona, and so forth—to name a few examples.

With regard to the MTQE score/label, the output of the generative AI model is scored by the MTQE model; if the result is not satisfactory, the generative AI model is invoked again. The new invocation receives the generative AI model output from the first invocation, and the new invocation may use a different prompt than the first one. This process repeats until the translation is acceptable (based on scoring), or for a specified number of tries.

The present disclosure also enables other advantages such as the incorporation of a feedback database to override a top candidate, as well as allowing a user to override the choice and then the system could self-calibrate from that choice.

Additionally, an example translation system could calculate a before and after MTQE for the whole paragraph/document to display the value of automated post-editing. In some embodiments, an example translation system of the present disclosure could accept human translation as input instead of MT, use approved TMs (Translation Memories) with context information to improve MTQE, or use agents other than MTQE (e.g., external, or future onboard LMs) to further enhance the output.

Upon gauging the quality of the initial translation and integrating insights from the metadata and document context, the system can then produce the improved translation 26. This refined output is a culmination of iterative processes and feedback loops, which optimizes/improves the translation for clarity, accuracy, and contextual relevance.

These features described herein, related to machine-driven translation improvements can be extremely useful in the context of certain use cases. For example, when human involvement is unnecessary or impossible, such as when the documents being translated comprise sensitive information. The restriction of ensuring human eyes do not view the translations necessitate an entirely automated, computer driven solution.

The following paragraph provide a practical example. Suppose a multinational corporation wants to translate an internal document from English to Spanish. This document contains sensitive financial information that should not be disclosed.

The document is input into the system, and the MT system, as described in FIG. 1, first processes the document. This initial processing, as seen in our example, might turn the English sentence "The company's profits surged this quarter." to "La empresa beneficios incrementaron este trimestre." While this translation is not entirely incorrect, there may be nuances lost.

The system, having generated this translation, calculates the machine translation quality (MTQE) for this segment. If the score indicates a poor translation, the system may present this to the generative AI (GenAI) model for improvement. Given the context, like previous sentences or the document's financial nature, the GenAI might enhance the translation to "Los beneficios de la empresa aumentaron notablemente este trimestre."

On the post-editor interface, segments of the translated document are displayed alongside their quality scores. Consider another sentence from our example document: "This is a result of our new marketing strategies." The system might first translate it as "Esto es un resultado de nuestras estrategias de mercadeo nuevas." The post-editor, seeing the quality score, can opt to use the system to improve this particular segment.

The system would provide the generated AI model with the segment, metadata like the document's type (financial report) and context from surrounding text. An improved translation might be: "Esto es debido a nuestras nuevas estrategias de marketing." This mechanism to invoke GenAI and check for translation quality iteratively can be vital in situations where precision is paramount. For instance, when translating a legal document or a scientific paper, where even minor misinterpretations can lead to significant issues.

Another salient feature is the integration of a feedback database. Assume a scenario where a company frequently uses certain jargon or phrases. Over time, as translations are approved or overridden by users, this feedback can be stored and used to influence future translations, making them more in line with company-specific language.

This system's adaptability extends further. Should a professional translator provide a human translation of a segment, the system can use this as input, considering it alongside its Translation Memories (TMs) and context info to refine its output. In the corporate document scenario, if a section had previously been translated and approved, the system could prioritize this translation, ensuring consistency.

With each interaction and feedback, the system fine-tunes itself, for better accuracy and relevance. In situations where confidentiality is important, such as our financial document example, it ensures that sensitive information remains uncompromised by keeping the translation process entirely machine-driven.

In another example, consider the following the input segment 18 is "The quick brown fox jumps over the lazy dog." The metadata 14 would include a document genre: children's story; Intended audience: children ages 4-8. The document context 16 would include the following: "Once upon a time, there was a quick brown fox who liked to jump over the lazy dog."

The machine translation model 21 generates the following first translation 22: "Le renard brun rapide saute par-dessus le chien paresseux." The MTQE model estimates the machine translation quality 24 of the first translation 22 to be 0.8 on a scale of 0 to 1, where 1 is the highest quality.

Since the machine translation quality 24 is not satisfactory, the system refines the first translation 22 using the metadata 14, document context 16, and machine translation quality 24. The system generates the following improved translation 26: "The quick brown fox jumps over the lazy dog." The improved translation 26 is returned to the user.

FIG. 2 is a screenshot of an example user interface 200 where source segments of a document have been translated into target segments. The user interface 200 includes both source segments 202 and translated segments 204. The user interface 200 includes a panel 206 that illustrates an iterative translation process in progress. In this instance, a target segment 208 with low quality estimation is shown to the user in conjunction with a colored bar 210. Translations can be moved from red to orange, and from orange to green to indicate when the translation iteration is improving the translation. Also, this information is provided to the user in textual format in the panel 206. Also, a vertical bar 212 is used to visually indicate segments with a lower quality. Additionally, automated post-editing can be invoked and paused with button 214.

Figure 3:
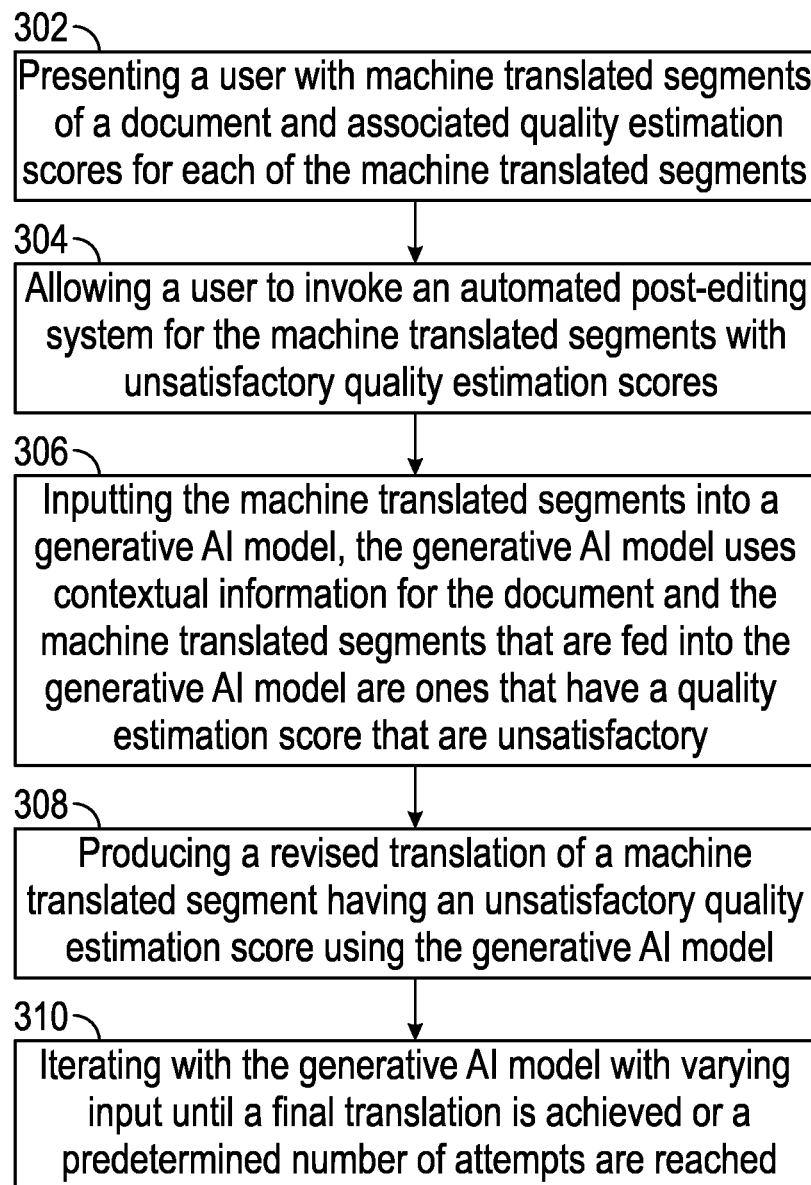
FIG. 3 is a flowchart of an example method of the present disclosure.

FIG. 3 illustrates an example method of the present disclosure, namely a method for automated post-editing of machine translated content. The method can include a step 302 presenting a user with machine translated segments of a document and associated quality estimation scores for each of the machine translated segments. For example, for a given document, source sentences or phrases can be translated into target segments, from a source language to one or more target languages.

The method includes a step 304 of allowing a user to invoke an automated post-editing system for the machine translated segments with unsatisfactory quality estimation scores. This could include providing a button on a user interface that can be actuated by the user to invoke. Other examples can include automatically invoking the automated post-editing system upon detecting that one or more of the machine translated segments have a quality estimation scores that is below a quality estimation score threshold. For example, all translated segments should have a quality estimation score of at least 90%.

Next, the method includes a step 306 of inputting the machine translated segments into a generative AI model. To be sure, the generative AI model uses contextual information for the document and the machine translated segments that are fed into the generative AI model have a quality estimation score that are unsatisfactory.

In some embodiments, the method can include a step 308 of producing a revised translation of a machine translated segment having an unsatisfactory translation (low quality estimation score) using the generative AI model. The revised translation is produced by using metadata or other contextual information for the document from which the machine translated segments were obtained. The method then includes a step 310 of iterating with the generative AI model with varying input until a final translation is achieved or a predetermined number of attempts are reached. That is, the method may stop iterating on a machine translated segment when the quality estimation score meets or exceeds the quality estimation score threshold, or when a predetermined number of iterations are performed and the revised translations do not meet or exceed the quality estimation score threshold. The number of times that the system may iterate is adjustable and can be tuned to user preferences.

In some instances, the step of iterating can include generating an updated quality estimation score for each revised translation and determining if that updated quality estimation score meets or exceeds expectations. The method can include generating an additional revised translation when the updated quality estimation score is still unsatisfactory.

In some embodiments, quality estimation scores associated with the machine translated segments are generated using a machine translation quality estimation model that is configured to identify machine translated segments with the unsatisfactory quality estimation scores. Thus, the system both scores and compares the scores as needed.

According to some embodiments, the contextual information provided to the generative AI model comprises a variable window of the contextual information adjacent to each of the machine translated segments to be processed by the automated post-editing system. That is, discreet segments of context are used. For example, the system may obtain a paragraph before or after the text in question to determine context. The context information can include other material such as genre, author, audience, or other factors.

Also, it will be understood that the automated post-editing system utilizes a machine translation quality estimation model to determine which machine translated segments require automated post-editing based on quality estimation scores. Additionally, the generative AI model of the automated post-editing system is iteratively prompted with varying input to enhance a quality of the revised translation, with the varying input being generated based on unsatisfactory aspects of previous translation attempts.

In order to improve the translation of a single segment with a poor quality estimation, the system can calculate before and after machine translation quality estimation (MTQE) scores for a whole paragraph or the document. Thus scores can also be generated for a larger corpus of data than sentences or phrases.

In some instances, a user can be allowed to correct an errant translation. The user can be presented with an option to manually intervene and provide input to the generative AI model to further improve a quality of the revised translation. While it is envisioned that the generative AI model operates in an automated manner, the option is available to the user to provide manual input.

As noted above, in some instances the automated post-editing system maintains a log of iterations, including prompts and responses, to facilitate analysis and quality control of the automated post-editing system. Also, the automated post-editing system incorporates feedback from a database to override a top candidate generated by the generative AI model. For example, a cache of previously translated segments, such as found in a translation memory, can be used.

Figure 4:
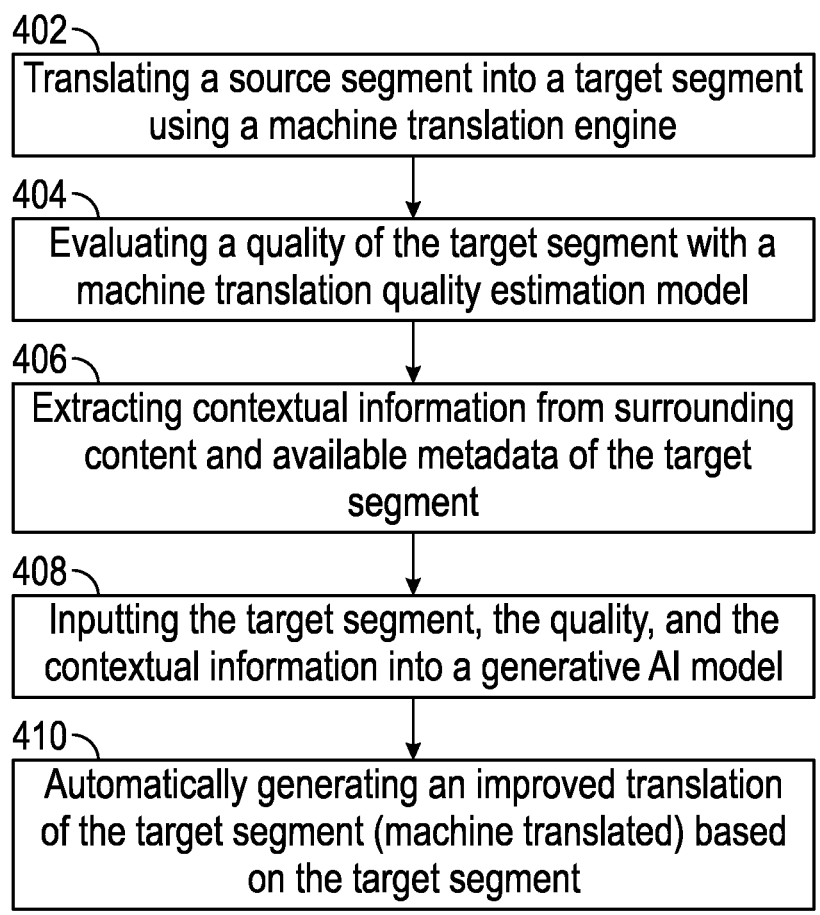
FIG. 4 is another flowchart of an example method of the present disclosure.

FIG. 4 illustrates another method of the present disclosure. The method can include a step 402 of translating a source segment into a target segment using a machine translation engine. Next, the method can include a step 404 of evaluating a translation quality of the target segment with a machine translation quality estimation model, as well as a step 406 of extracting contextual information from surrounding textual content and available metadata of the target segment (could be the document as a whole).

The method also includes a step 408 of inputting the target segment, the quality, and the contextual information into a generative AI model, as well as a step 410 of automatically generating an improved translation of the source content (improved version of the target segment) based on the target segment. These improved translations can be rescored and iteratively translated until a final translation is achieved or until a number of permitted attempts has been achieved.

Figure 5:
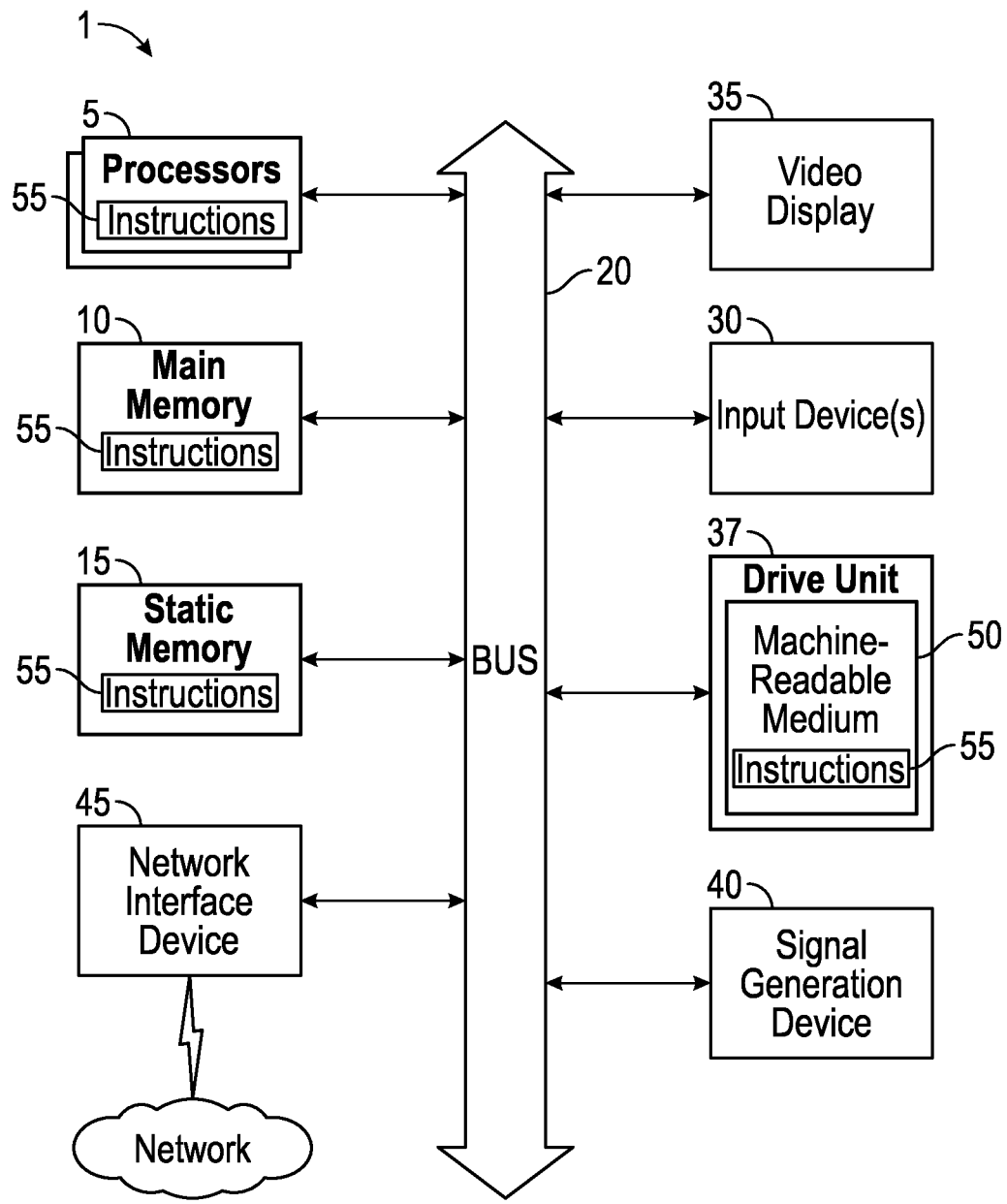
FIG. 5 is a schematic diagram of an example computer system that can be used to implement embodiments of the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and/or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for automated post-editing of machine translated content, the method comprising:
    presenting a user with machine translated segments of a document and associated quality estimation scores for each of the machine translated segments;
    allowing the user to invoke an automated post-editing system for machine translated segments with unsatisfactory quality estimation scores;
    inputting the machine translated segments with unsatisfactory quality estimation scores into a generative AI model, the generative AI model using contextual information for the document;
    producing a revised translation of a machine translated segment using the generative AI model; and
    iterating with the generative AI model with varying input until a final translation is achieved or a predetermined number of attempts are reached.

2. The method of claim 1, wherein iterating includes:
    generating an updated quality estimation score for the revised translation, and
    generating an additional revised translation when the updated quality estimation score is unsatisfactory.

3. The method of claim 1, wherein quality estimation scores associated with the machine translated segments are generated using a machine translation quality estimation model that is configured to identify machine translated segments with unsatisfactory translation quality.

4. The method of claim 1, wherein the contextual information is provided to the generative AI model, the contextual information comprising a variable window of text adjacent to each of the machine translated segments with unsatisfactory quality estimation scores, each of the machine translated segments with unsatisfactory quality estimation scores to be processed by the automated post-editing system.

5. The method of claim 1, wherein the generative AI model is employed for revising a machine translated segment and is based on a transformer architecture.

6. The method of claim 1, wherein the automated post-editing system utilizes a machine translation quality estimation model to determine which machine translated segments require automated post-editing based on quality estimation scores.

7. The method of claim 1, wherein the generative AI model is iteratively prompted with varying input to enhance a quality of the revised translation, with the varying input being generated based on unsatisfactory aspects of previous translation attempts.

8. The method of claim 1, wherein the user is presented with an option to manually intervene and provide input to the generative AI model to further improve a quality of the revised translation.

9. The method of claim 1, wherein the predetermined number of attempts is for achieving a satisfactory translation and is configurable by the user or a system administrator.

10. The method of claim 1, wherein the automated post-editing system maintains a log of iterations, including prompts and responses, to facilitate analysis and quality control of the automated post-editing system.

11. The method of claim 1, wherein the automated post-editing system incorporates feedback from a database to override a top candidate generated by the generative AI model.

12. The method of claim 1, further comprising allowing the user to override a choice made by the automated post-editing system.

13. The method of claim 1, further comprising calculating a before machine translation quality estimation (MTQE) score and calculating an after MTQE score, for a whole paragraph or the document.

14. The method of claim 1, further comprising accepting human translation as input instead of machine translation and applying automated post-editing to enhance the human translation.

15. The method of claim 1, further comprising incorporating an additional agent to further enhance output of the automated post-editing system.

16. A method for enhancing machine translated content using contextual information, the method comprising:
- translating a source segment into a target segment using a machine translation engine;
- evaluating a quality of the target segment with a machine translation quality estimation model;
- extracting contextual information from surrounding content and available metadata of the target segment;
- inputting the target segment, the quality, and the contextual information into a generative AI model; and
- automatically generating an improved translation of the target segment based on the target segment.

17. A system for automated improvement of machine translated content, the system comprising:
- a memory for storing executable instructions; and
- a processor coupled to the memory, the processor for executing the executable instructions to provide:
  - an interface for displaying machine translated segments of a document, associated quality estimation scores, and options for invoking automatic post-editing;
  - a machine translation engine configured to produce the machine translated segments;
  - a quality estimation model in communication with the machine translation engine and configured to evaluate and create quality estimation scores for each of the machine translated segments;
  - a generative AI model operatively coupled to the interface, and configured to receive user input and contextual information about one or more of the machine translated segments; and
  - a feedback mechanism for the generative AI model to use previous outputs and additional prompts to iteratively produce improved translations based on the contextual information and feedback from the quality estimation model.

18. The system of claim 17, wherein the machine translated segments are presented to a user in the interface, enabling selection and invocation of the generative AI model.

19. The system of claim 18, wherein the quality estimation scores are generated using a machine translation quality estimation model, which identifies machine translated segments with unsatisfactory translation quality.

20. The system of claim 19, wherein the contextual information received by the generative AI model comprises a variable window of document context surrounding each of machine translated segments to be automatically post-edited.

* * * * *